United States Patent
Rodman et al.

(10) Patent No.: US 7,526,078 B2
(45) Date of Patent: Apr. 28, 2009

(54) SYSTEM AND METHOD FOR COMMUNICATING DATA DURING AN AUDIO CONFERENCE

(75) Inventors: Jeffrey Rodman, San Francisco, CA (US); David Drell, Austin, TX (US)

(73) Assignee: Polycom, Inc, Pleasanton, CA (US)

( * ) Notice: Subject to any disclaimer, the term of this patent is extended or adjusted under 35 U.S.C. 154(b) by 997 days.

(21) Appl. No.: 10/378,709

(22) Filed: Mar. 3, 2003

(65) Prior Publication Data

US 2004/0022375 A1 Feb. 5, 2004

Related U.S. Application Data

(63) Continuation-in-part of application No. 10/335,108, filed on Dec. 31, 2002, now Pat. No. 7,221,663.

(60) Provisional application No. 60/360,984, filed on Mar. 1, 2002.

(51) Int. Cl.
H04M 3/42 (2006.01)

(52) U.S. Cl. .................. 379/202.01; 370/260; 370/261; 700/94; 348/14.01; 348/14.09; 348/14.1; 348/14.11; 348/14.12; 348/14.13

(58) Field of Classification Search ............ 379/202.01; 370/260, 261; 348/14.01, 14.09, 14.1, 14.11, 348/14.12, 14.13; 700/94
See application file for complete search history.

(56) References Cited

U.S. PATENT DOCUMENTS

| | | | |
|---|---|---|---|
| 3,573,377 A | 4/1971 | Anderson | |
| 3,612,767 A | 10/1971 | Anderson | |
| 3,649,761 A | 3/1972 | Bush | |
| 4,058,769 A * | 11/1977 | Alderman | 455/108 |
| 4,257,119 A | 3/1981 | Pitrods | |
| 4,763,317 A | 8/1988 | Lehman | |
| 5,473,631 A * | 12/1995 | Moses | 375/130 |
| 5,572,247 A * | 11/1996 | Montgomery et al. | 725/139 |

(Continued)

FOREIGN PATENT DOCUMENTS

EP 0 669 749 A1 8/1995

OTHER PUBLICATIONS

P. Mermelstein, "XP-001025802 G722, a New CCITT Coding Standard for Digital Transmission of Wideband Audio Signals," IEEE Communications Magazine; Jan. 1988—vol. 26, No. 1 pp. 8-15.

(Continued)

Primary Examiner—Quynh H Nguyen
(74) Attorney, Agent, or Firm—Wong, Cabello, Lutsch, Rutherford & Brucculeri, LLP

(57) ABSTRACT

A method for communicating data during an audio conference is provided. Digital data is received from a data source. The digital data is then modulated onto a carrier signal. The modulated carrier signal is subsequently combined with an audio signal of the audio conference. The combined signal is communicated to at least one remote communication device. Upon receipt by the at least one remote communication device, the combined signal is separated into the audio signal and the modulated carrier signal. The modulated carrier signal is then demodulated to extract the digital data. Both the digital data and the audio signal are output by the at least one remote communication device.

15 Claims, 13 Drawing Sheets

U.S. PATENT DOCUMENTS

| | | |
|---|---|---|
| 5,677,728 A | 10/1997 | Schoolman |
| 5,983,261 A | 11/1999 | Riddle |
| 6,049,531 A | 4/2000 | Roy |
| 6,088,368 A | 7/2000 | Rubinstain |
| 6,130,880 A | 10/2000 | Naudus |
| 6,134,223 A * | 10/2000 | Burke et al. ................ 370/265 |
| 6,345,047 B1 | 2/2002 | Regnier |
| 6,421,355 B1 | 7/2002 | Quiring |
| 6,453,022 B1 * | 9/2002 | Weinman, Jr. ........... 379/88.13 |
| 2001/0008556 A1 | 7/2001 | Bauer |
| 2001/0033613 A1 | 10/2001 | Vitenberg |
| 2002/0093985 A1 | 7/2002 | Nimmagadda |
| 2002/0097679 A1 | 7/2002 | Berenbaum |
| 2002/0122429 A1 | 9/2002 | Griggs |
| 2002/0131377 A1 * | 9/2002 | DeJaco et al. ............... 370/329 |

OTHER PUBLICATIONS

Schulzrinne, Voice Communication Across the Internet: A Network Voice Terminal, 1992, pp. 1-34, Amherst, MA.

Haojun, Implementing an Audio Multipoint Processor on DSP Array, 2001, pp. 441-444.

Jung, The Multimedia Desktop Conference System Adaptability in Network Traffic on LAN, 1995, pp. 334-338, IEEE.

Noore, Computer-Based Multimedia Video Conferencing System, 1993, pp. 587-591.

Sasse, Workstation-based Multimedia Conferencing: Experiences from the MICE Project, 1994, pp. 1-6.

* cited by examiner

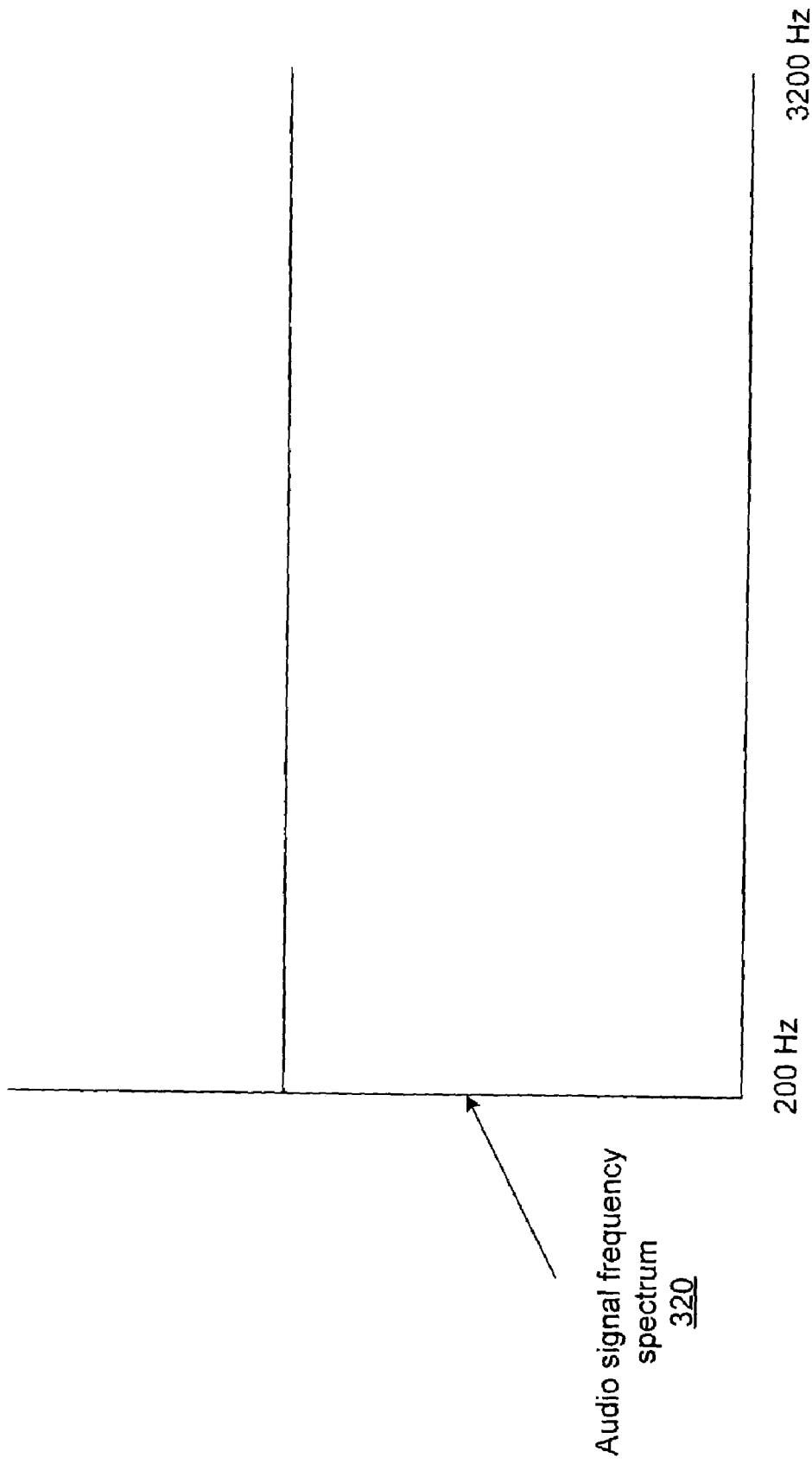

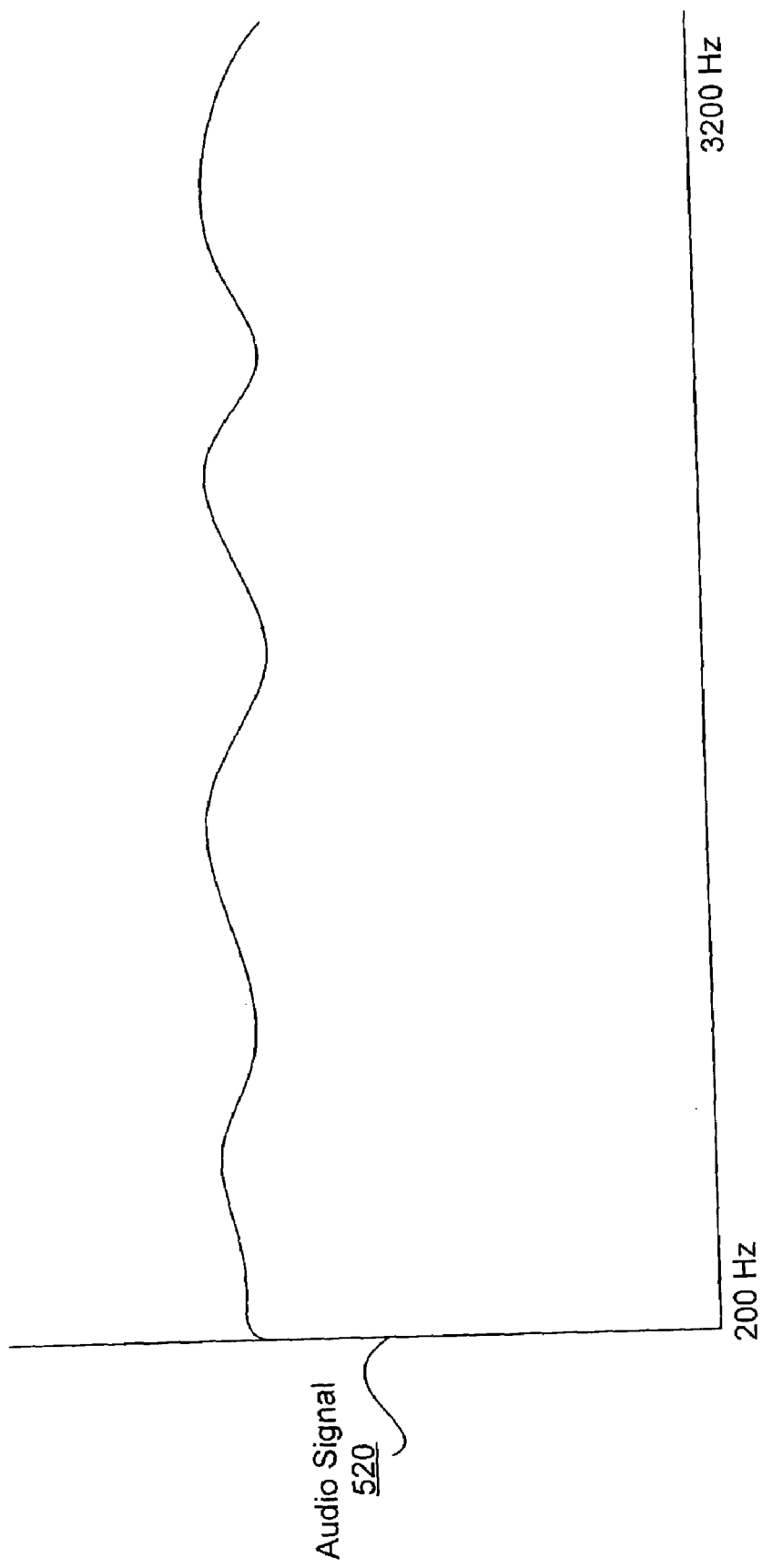

SYSTEM AND METHOD FOR COMMUNICATING DATA DURING AN AUDIO CONFERENCE

CROSS-REFERENCES TO RELATED APPLICATIONS

The present application claims priority from Provisional Patent Application Ser. No. 60/360,984, filed Mar. 1, 2002, which is incorporated herein by reference in its entirety. The present application is also a continuation in part of patent application Ser. No. 10/335,108, entitled Method and Apparatus for Wideband Conferencing, filed Dec. 31, 2002, now U.S. Pat. No. 7,221,663.

BACKGROUND OF THE INVENTION

1. Field of the Invention

The present invention relates generally to the field of teleconferencing systems, and more particularly to communication of data during an audio conference.

2. Background of the Invention

The telecommunications industry is constantly creating alternatives to travel for reaching a meeting forum. Teleconferencing has enabled many users to avoid long and expensive trips merely to meet with others to discuss business related topics and make important decisions. In addition, teleconferencing often replaces face to face meetings involving even the shortest of trips, such as those involving office locations relatively close in distance.

While teleconferencing typically offers good sound quality, attempting to send data over the same audio channel frequently disrupts a teleconference by diminishing the sound quality. Data, such as call control signals, can be sent via in-band signaling. However, conventional in-band signaling typically interrupts a call.

In order for participants to receive any type of data related to the call or otherwise (e.g., exchanging information via electronic mail (E-mail) while on the call), a separate communication channel must be utilized according to some prior art systems. Disadvantageously, having more than one channel can be distracting to the participants. A further disadvantage is that some type of connection to a network must be established for each communication channel. Unfortunately, all rooms are not equipped with numerous network connection outlets. Further, participants may connect at different speeds, so that all participants may not receive data at the same time. Yet another disadvantage of requiring numerous network connections to gain access to data related to the teleconference is that participants may be tempted to perform other activities while connected to the network.

Further, businesses and organizations mainly have PSTN lines. However, not all businesses and organizations have other dedicated communication lines such as ISDN or LAN. Accordingly, transfer of data related to the teleconference generally may be impossible without call interruption in prior art systems.

While a variety of processes exist for sending data over an existing audio connection, these processes typically are unable to send the data without some disruption, require a great deal of signal processing, are expensive to implement, etc. For example, on-off keying of a carrier has long been used to carry digital data over an analog channel (e.g., Morse code). However, while this process requires minimal processing, it is extremely disruptive to an audio signal present in the same channel. Frequency-shift keying of a carrier has also long been utilized, but this process makes any other use of the audio channel virtually impossible. Using DTMF tones is a common technique on telephone lines, but using DTMF tones is also very disruptive to a conversation occurring via the telephone lines.

Various types of modems are capable of carrying data over an audio channel at rates of 200 bps to 56,000 bps, but this process fully occupies the audio channel, precluding other uses of the audio channel. Hybrid modems implementing "voice over data" have been implemented to share an audio channel with data, but these modems require intensive computational power to recover the data. Further, without processing, these hybrid modems render the audio channel unusable since the voice is digitized and sent as data, requiring the modem to operate, using a great deal of computational power. An unprocessed audio channel emits a loud noise, like the normal sound emitted by a data modem.

Therefore, there is a need for a system and method for providing data to teleconference participants without interrupting the call or requiring intensive processing of digital or analog signals. Furthermore, there is a need for a process for embedding a low data-rate data connection within an existing narrow-band connection with minimal processing.

SUMMARY OF THE INVENTION

The present invention provides in various embodiments a system and method for communicating data during an audio conference. In one embodiment, an audio signal is received. Digital data is also received from a data source. The digital data is then modulated onto a carrier signal, and the modulated carrier signal is subsequently combined with the audio signal. The combined signal is then communicated to at least one remote communication device.

According to an exemplary embodiment of the present invention, a system for communicating data during an audio conference is provided. A signal generator generates a carrier signal. A modulator then modulates digital data received from a data source onto the carrier signal. A product signal module coupled to the modulator subsequently combines the modulated carrier signal with an audio signal to create a product signal. The product signal is then communicated to at least one remote communication device by a communication interface via an audio channel.

Upon receipt by the at least one remote communication device, the combined signal is separated into the audio signal and the modulated carrier signal. The modulated carrier signal is then demodulated to extract the digital data. Both the digital data and the audio signal are output by the at least one remote communication device.

A further understanding of the nature and advantages of the inventions herein may be realized by reference to the remaining portions of the specification and the attached drawings.

BRIEF DESCRIPTION OF THE DRAWINGS

FIGS. 3A-3D illustrate an exemplary architecture for sending digital data over the audio channel in accordance with an embodiment of the present invention;

FIGS. 5A-5D illustrate an alternative architecture for sending digital data via the audio channel in accordance with the present invention;

DESCRIPTION OF THE EXEMPLARY EMBODIMENTS

Figure 1:
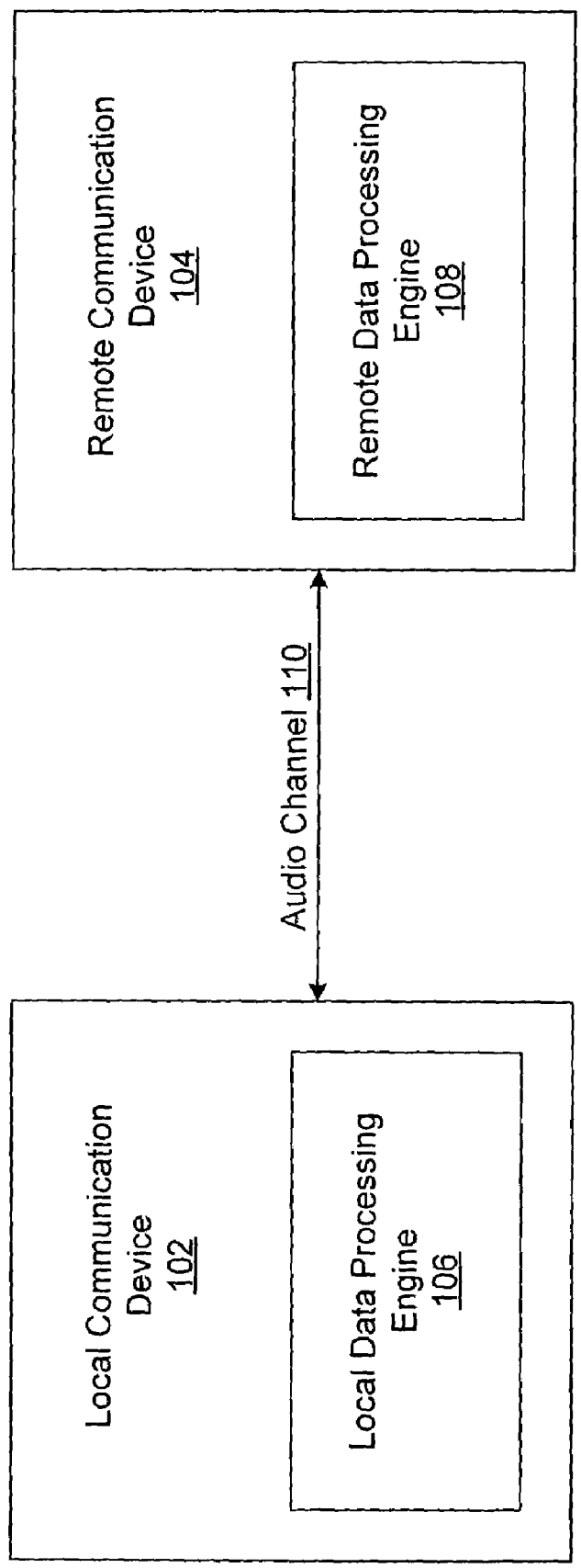
FIG. 1 is a schematic diagram illustrating an exemplary architecture for communicating audio signals including embedded digital data from a local communication device to a remote communication device.

As shown in the exemplary drawings wherein like reference numerals indicate like or corresponding elements among the figures, an embodiment of a system according to the present invention will now be described in detail. The following description sets forth an example of a system and method for communicating data during an audio conference.

Referring now to FIG. 1, a schematic diagram illustrating an exemplary architecture for communicating audio signals including embedded digital data from a local communication device 102 to a remote communication device 104 is shown. The local communication device 102 comprises a local data processing engine 106. Similarly, the remote communication device 104 comprises a remote data processing engine 108. Generally, the local data processing engine 106 prepares digital data for communication to the remote communication device 104 via an audio channel 110, such as a POTS line. The remote data engine 108 processes the digital data received via the audio channel 110 and provides the data to a remote user of the remote communication device 104. The digital data being communicated over the audio channel 110 is separate from the analog signals typically being communicated via the audio channel 110. Further, the digital data being communicated over the audio channel 110 does not interrupt an existing call, is not difficult to process, and is not detectable by call participants.

The local communication device 102 and/or the remote communication device 104 may be a conventional telephone, a digital telephone, a cellular telephone, a speakerphone, a videoconference device, or any other telecommunication device. In one embodiment of the present invention, the local communication device 102 and the remote communication device 104 are equipped with modems for facilitating transmission of encapsulated data over the POTS line.

FIG. 1 illustrates one exemplary architecture for communicating digital data in addition to digital and/or analog audio data already being communicated via the audio channel 110 from the local communication device 102 to one or more remote communication devices 104. Although a single local communication device 102 and a single remote communication device 104 is shown in FIG. 1, more than one local communication device 102 and/or more than one remote communication device 104 is within the scope of the present invention. Various other architectures in accordance with the present system are contemplated. As one example, other devices may be coupled to the local communication device 102 and/or the remote communication device 104, such as overhead projectors, cameras, printers, scanners, etc. These other devices may provide the data to be transmitted to the remote communication device 104.

Figure 2:
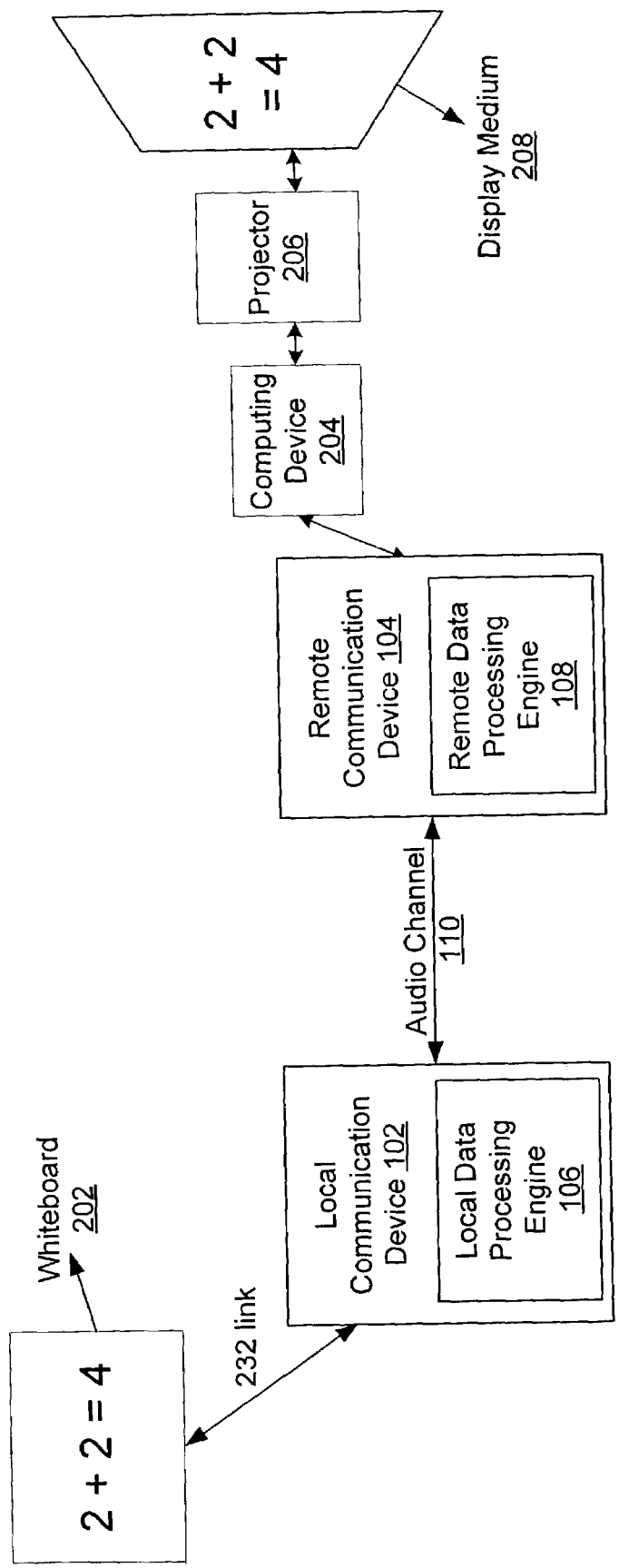
FIG. 2 is an exemplary embodiment for providing digital data over an existing audio channel via in-band signaling in accordance with the present invention.

Referring now to FIG. 2, an exemplary embodiment for providing digital data over the existing audio channel 110 via in-band signaling in accordance with the present invention is shown. The local communication device 102 exchanges audio signals via the audio channel 110 with the remote communication device 104. In order to send digital data in addition to the normal audio signals over the same audio channel 110, a low data-rate data connection is embedded within an existing narrow-band connection. Utilizing this process, also referred to as low profile signaling protocol (LPSP), to transmit data during audio communication, various types of data aside from the normal audio data can be exchanged by way of embedded digital signals. For example, conference related data, such as spreadsheets or diagrams, can be exchanged.

As a more specific example, output from medical devices or any other devices can be sent to an expert during a phone call by persons attending to the medical devices. By this feature, the expert can receive pertinent data while on the phone call in which the expert may be providing instructions to persons located in proximity to the medical devices based on the data being received by the expert. Numerous applications of the process of transmitting data during audio communication using embedded digital signals are possible. Further, utilizing the system described herein to send data over the audio channel 110 avoids interruptions to the phone call. Thus, users experience no noticeable call noise or interruption as a result of sending digital data over the audio channel 110.

In FIG. 2, the example of the digital data being transmitted to the remote communication device 104 is of an image from a whiteboard 202. Thus, as the local communication device 102 transmits audio signals to the remote communication device 104, digital data is also transmitted over the audio channel 110. The digital data includes images from the whiteboard 202 associated with the local communication device 102, thus allowing the remote communication device 104 to reproduce the images on a display medium 208 associated with the remote communication device 104.

The data from the whiteboard 202 can be communicated to the local communication device 102 via any type of connection suitable for use with the present invention, such as via a 232 link. The local communication device 102 receives the data from the whiteboard 202 and the local data processing engine 106 packages the data for transmission via the audio channel 110. Although FIG. 2 shows the whiteboard 202 coupled to the local communication device 102, any device may be coupled to the local communication device 102 for providing data to the local communication device 102, receiving data from the local communication device 102, etc. in accordance with the present invention.

A computing device 204, such as a personal computer, may optionally be associated with and/or coupled to the remote communication device 104. The computing device 204 can process and play the audio data from the audio signals. Further, in the present example, the computing device 204 can utilize a projector 206 to display the digital data received from the whiteboard 202 onto the display medium 208, such as a whiteboard, screen, etc. associated with the remote communication device 104, as discussed herein. Alternatively, the images from the whiteboard 202 received via the digital data transmitted during the audio communication may be displayed on a display medium of the computing device 204 itself.

Conversely, the projector 206, may utilize the audio channel 110 to forward digital data back to the local communication device 102. For example, the projector 206, via the computing device 204 and the remote communication device 104 can forward digital data to the local communication device 102 during audio communication indicating that a packet was not received. FIG. 2 illustrates just one example for transmitting data during audio communication. Alternatively, other devices may be coupled to the local communication device 102 and the remote communication device 104 for providing and displaying various types of digital data transmitted via the audio channel 110.

Figure 3A:
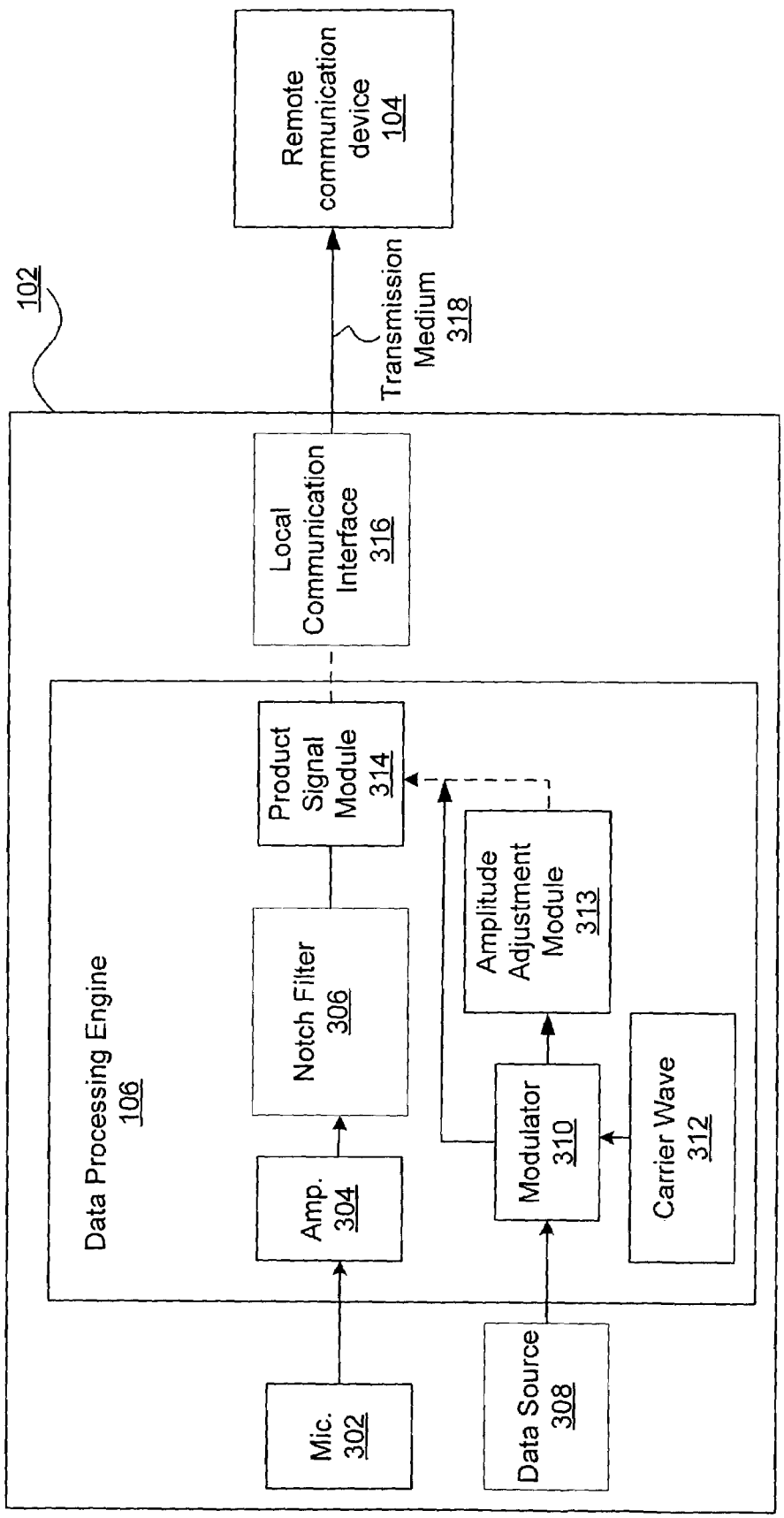

Referring now to FIG. 3A, a process for sending digital data over the audio channel 110 in accordance with an exemplary embodiment of the present system is shown. In this example, the local communication device 102 prepares the digital data for transmission to the remote communication device 104 via the audio channel 110. At least one microphone 302 or other acoustic device collects audio data and converts the audio data into an audio signal. The audio signal is then fed into an amplifier 304 for adjustment.

A portion of the audio signal is then filtered out by a notch filter 306. In other words, the audio signal is passed through the notch filter 306, which removes content in a spectral region where a modulated carrier signal will exist, as discussed herein. The notch filter 306 creates a subset of the audio signal frequency spectrum for forwarding the digital data. In an alternative embodiment, the notch filter 306 creates multiple subsets of the audio signal frequency spectrum. The remaining portion of the audio signal frequency spectrum is utilized for the transmission of normal audio data. Typically, the portion of the audio signal frequency spectrum removed via the notch filter 306 is as little as possible and at the higher end of the frequency spectrum. For example, a 3000 to 3100 Hertz (Hz) portion of the frequency spectrum of a conventional phone line, which accommodates data between 300 to 3300 Hz, may be reserved for sending data across the audio channel 110.

A data source 308 provides digital data to be forwarded via the audio channel 110. This data may include, but is not limited to, data from the whiteboard 202, a projector, a computing device, etc. A signal generator 312 creates a carrier signal, which is forwarded to a modulator 310. The modulator 310 then modulates the digital data from the data source 308 onto the carrier signal. In one embodiment, the modulator determines the spectrum associated with the audio signal. Any type of modulation suitable for use with the present invention may be employed, such as amplitude modulation, quadrature phase modulation, phase or differential phase modulation, and so on.

Optionally, an amplitude adjustment module 313 may be provided for adjusting the amplitude of the modulated carrier signal proportionally to an instantaneous amplitude of the audio signal. The adjustment may be made based on the amplitude of the audio signal in a region of a spectrum near a region occupied by the modulated carrier signal.

Once modulated, the modulated carrier signal is forwarded to a product signal module 314 where a product signal of the audio signals combined with the modulated carrier signal is created. Accordingly, the modulated carrier signal is embedded into the audio signal in the portion of the audio signal filtered out by the notch filter 306. In the embodiment having multiple subsets of the audio signal reserved by the notch filter 306, as discussed herein, multiple carrier signals are created and embedded into the audio signal in the subsets of the audio signal frequency spectrum reserved therefore. The modulated carrier signal is typically added to the audio signal at a very low amplitude. Accordingly, the modulated carrier signal is inaudible to, or "masked" from, the ordinary listener. A local communication interface 316 communicates the product signal to the remote communication device 104 by way of the existing audio channel 110 via a transmission medium 318. Any suitable transmission medium 318 may be utilized in accordance with the present invention.

The data source 308 may include any suitable source of data. For example, the data may be from an internal source, such as a source of data within a particular company, a 232 link, etc. For instance, an internal source of the data may be the data from a whiteboard, data from an internal server, data from a computing device, etc.

Referring now to FIG. 3B, an exemplary audio signal frequency spectrum 320 is shown. As discussed herein, in order to send the digital data in addition to the audio data being communicated via the audio signal, a portion of the audio signal frequency spectrum 320 is reserved. Typically, a conventional phone line can accommodate data between 200 to 3200 Hertz (Hz). A portion of that audio signal frequency spectrum 320 is reserved for sending data in addition to, and/or separate from, the normal audio signals being carried across the audio channel 110 (FIG. 1). For example, the 3000 to 3100 Hz portion of the frequency spectrum may be reserved for sending data across the existing audio channel 110, as discussed herein. However, reserving any portion of the audio signal frequency spectrum 320 of the audio signal is within the scope of the present invention. While reserving the portion of the audio signal frequency spectrum 320 may slightly diminish capacity for sending audio signals, this process allows for the exchange of additional data across the existing audio channel 110. As discussed herein, users of the phone line experience no call interruption or distortion in the transmitted audio. Accordingly, users can exchange data in addition to the normal audio signal data being carried over the audio channel 110 without experiencing any noticeable call interruption and without having to establish multiple communication channels. It is understood that this is merely one example of the use of the present invention. Other devices may be utilized to communicate other types of data. For example, overhead projectors, computers, video cameras, etc. may be utilized to communicate data via the carrier signal.

Figure 3C:
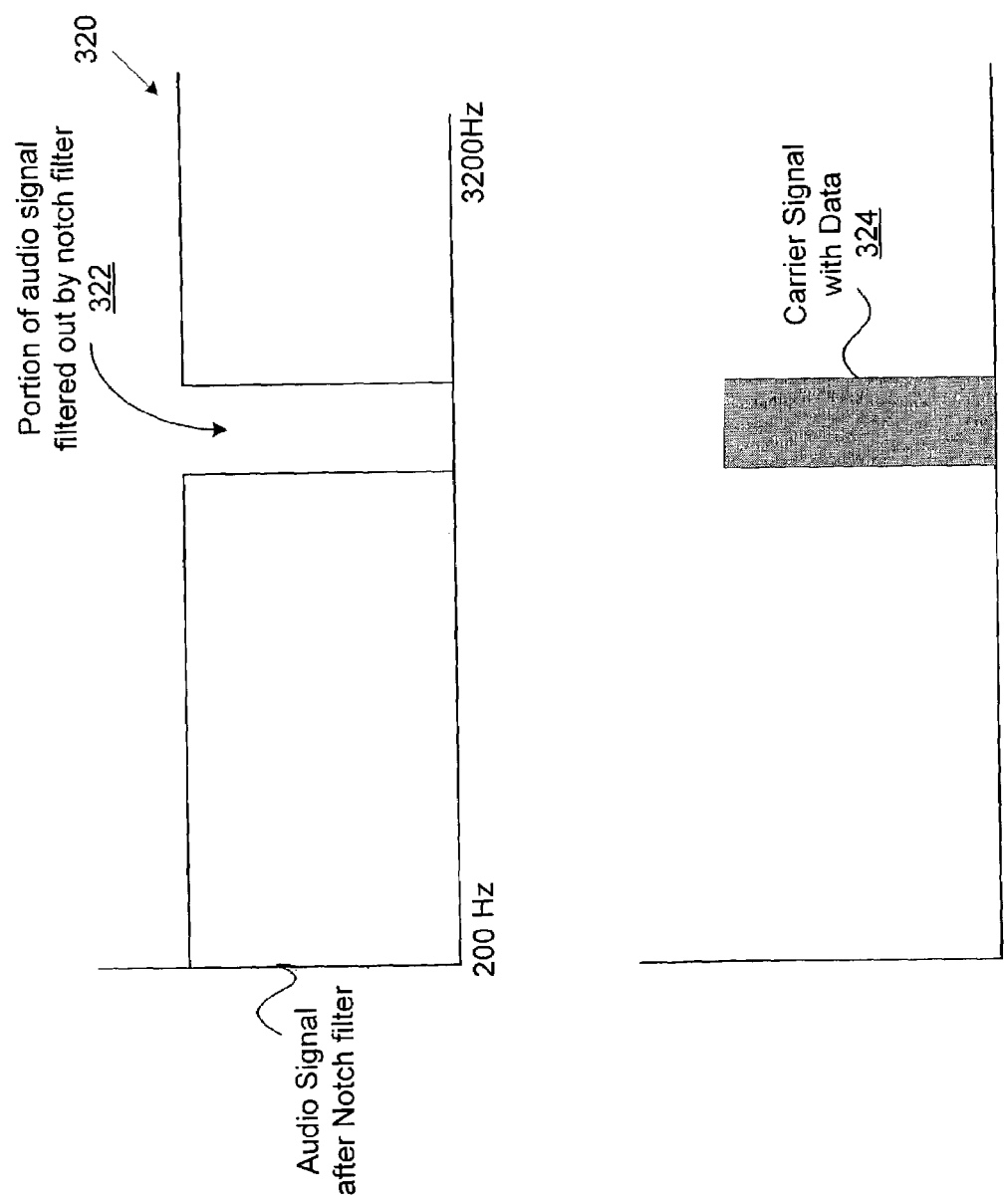

Referring now to FIG. 3C, the audio signal frequency spectrum 320 after being filtered by the notch filter 306 (FIG. 3A) is shown. A portion 322 of the audio signal frequency spectrum 320 has been filtered out by the notch filter 306. A modulated carrier signal 324 is created for insertion into the portion 322 of the audio signal frequency spectrum 320.

Figure 3D:
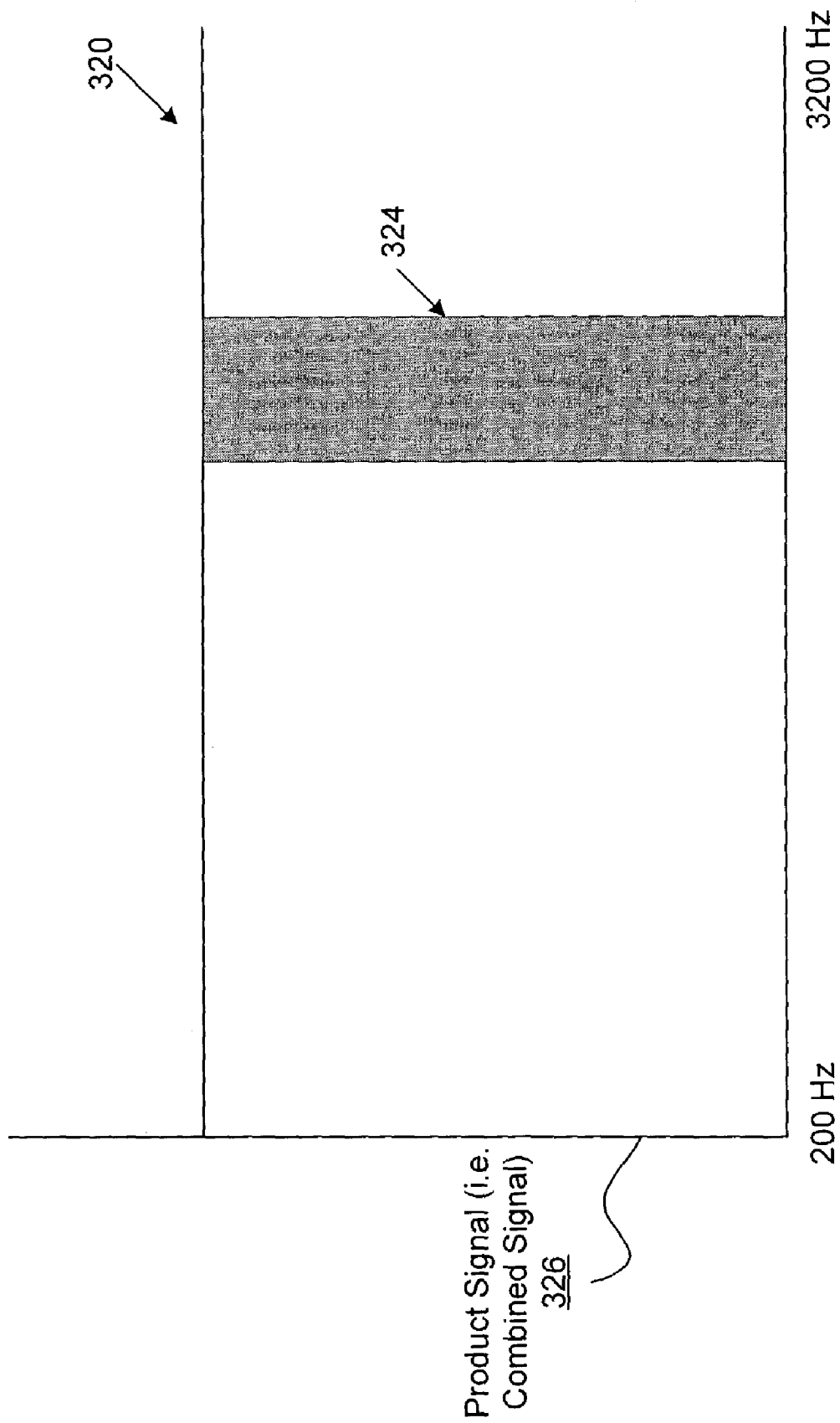

Referring now to FIG. 3D, a product signal 326 in accordance with an embodiment of the present invention is shown. The product signal 326 is the combination of the audio signal frequency spectrum 320 (FIG. 3B), the audio signal frequency spectrum 320 portion 322 (FIG. 3C) filtered out by the notch filter 306 (FIG. 3A), and the modulated carrier signal 324 inserted into the portion 322. As discussed herein, the product signal module 314 (FIG. 3A) combines the audio signals and the modulated carrier signal 324. The product signal 326 is then communicated to the remote communication device 104 (FIG. 1) by the local communication interface 316 (FIG. 3A) of the local communication device 102 (FIG. 1) via a transmission medium 318 (FIG. 3A).

Figure 4:
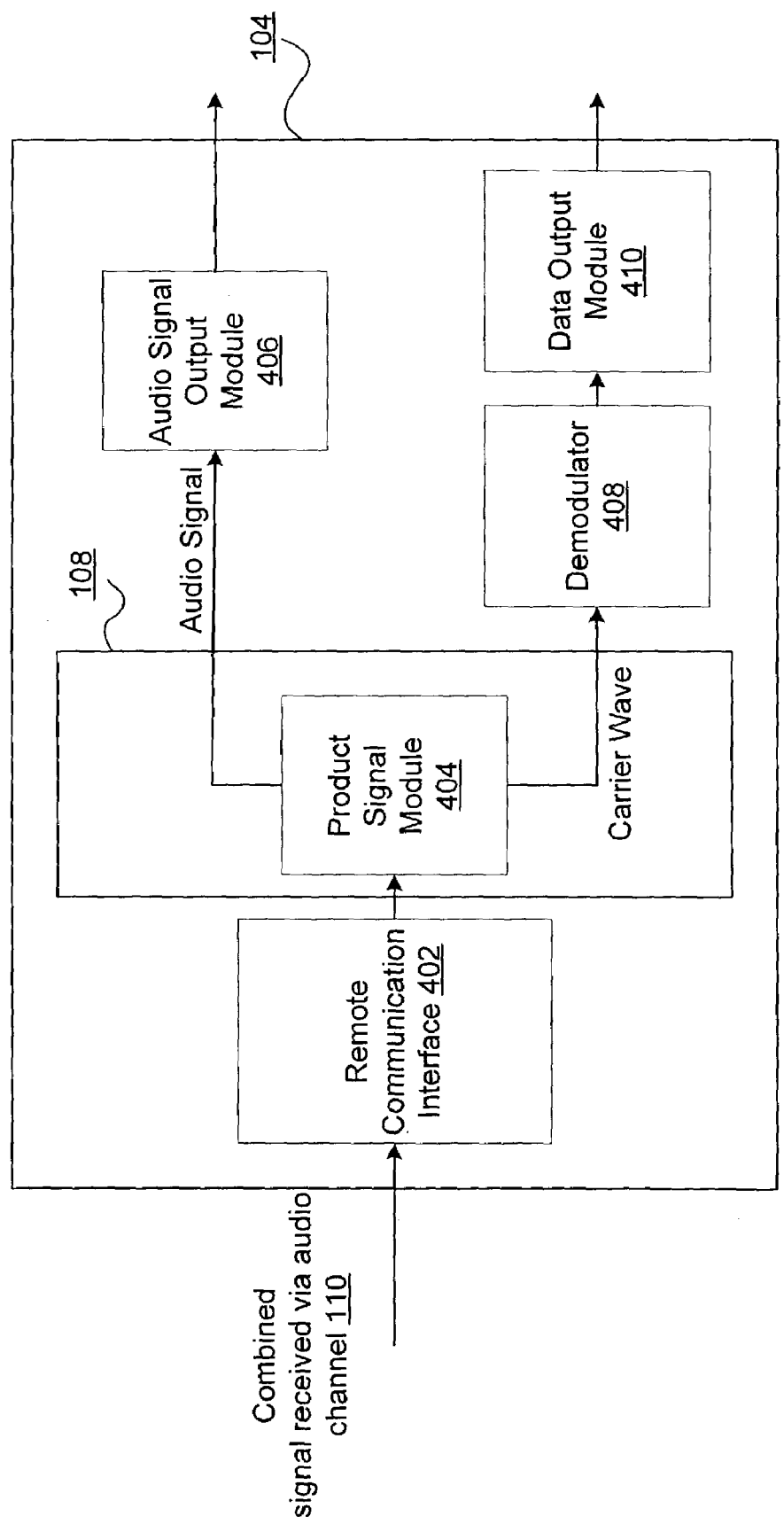
FIG. 4 illustrates an exemplary architecture for extracting data from the audio channel at the remote communication device.

Referring now to FIG. 4, an exemplary block diagram illustrating extraction of data from the audio channel 110 at the remote communication device 104 (FIG. 1) is shown. The audio signal with the modulated carrier signal (i.e., product signal 326 (FIG. 3D)) is initially received by a remote communication interface 402, and forwarded to a product signal module 404, which separates the audio signal from the modulated carrier signal. The audio signal may be output by the audio signal output module 406. For instance, the audio signal may be amplified and played via a speaker associated with the remote communication device 104. The speaker may be located in the remote communication device 104 or, alternatively, the speaker may be coupled to the remote communication device 104.

Substantially concurrently, the modulated carrier signal 324 (FIG. 3C) is sent to a demodulator 408, which demodulates the modulated carrier signal 324. Subsequently, the digital data is forwarded to a data output module 410, which can output the data to the user. For example, the data may be displayed via a display medium associated with the remote communication device 104, utilized by the remote communication device 104, etc. As discussed herein, the present system works in a reverse manner in order to respond to the digital data received from the local communication device 102 (FIG. 1) or to otherwise send data to the local communication device 102.

Referring now to FIG. 5, an alternative embodiment for sending digital data via the audio channel 110 in accordance with the present invention is shown. As previously discussed, at least one microphone 502 or acoustic device collects audio data and converts the audio data into an audio signal, which is then passed through an amplifier 504. Digital data is also received from a data source 506. However, in this embodiment a spread spectrum carrier wave is generated by a spread spectrum carrier wave generator 508 and provided to a modulator 510. The modulator 510 is utilized to modulate the digital data from the data source 506 onto the spread spectrum carrier wave, which is subsequently combined with the audio signal by a product signal module 512.

In one embodiment, the digital data from the data source 506 is modulated onto the audio signal at a low amplitude and over all or a substantial portion of bandwidth of the audio signal. Accordingly, the product signal module 512 causes the spectrum of the spread spectrum carrier wave to spread over all or a portion of the bandwidth of the audio signal, so the added noise from the digital data is small enough to be undetectable to the ordinary listener. Any suitable spread spectrum technique may be utilized in accordance with the present invention. For example, an ultrasonic spread spectrum technique or an audio spread spectrum technique may be utilized.

Similar to the FIG. 3A embodiment, a local communication interface 514 at the local communication device 102 forwards the product signal or combined signal to the remote communication device 104 via the transmission medium 516, such as a PSTN, by way of the audio channel 110 (FIG. 1). Although not shown, the remote communication device 104, upon receipt of the product signal, filters the product signal and separates the audio signal from the modulated carrier signal. Subsequently, the audio signal data is output via an output medium associated with the remote communication device 104, such as a speaker. The digital data from the data source 506 is extracted and output via a data output medium associated with the remote communication device 104, such as a display medium.

Figure 5A:
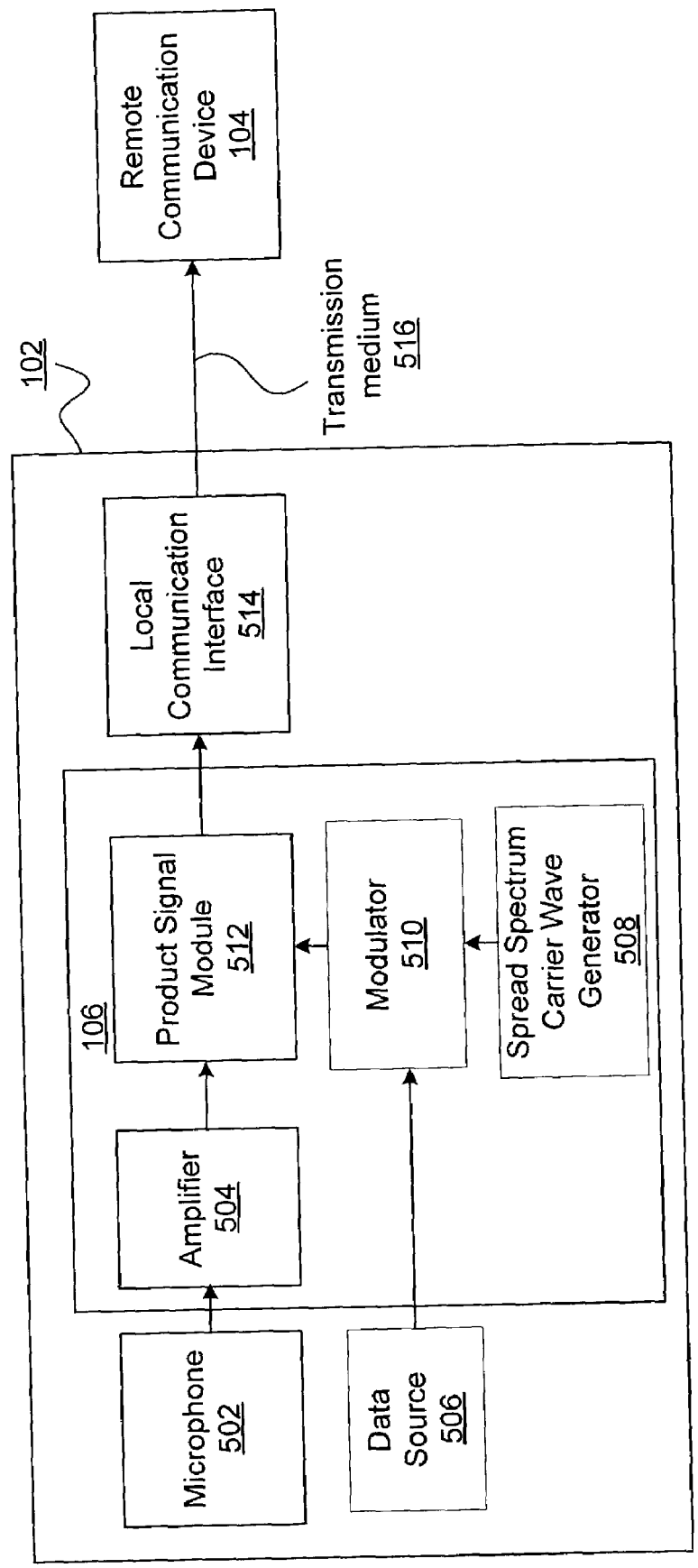
Figure 5C:
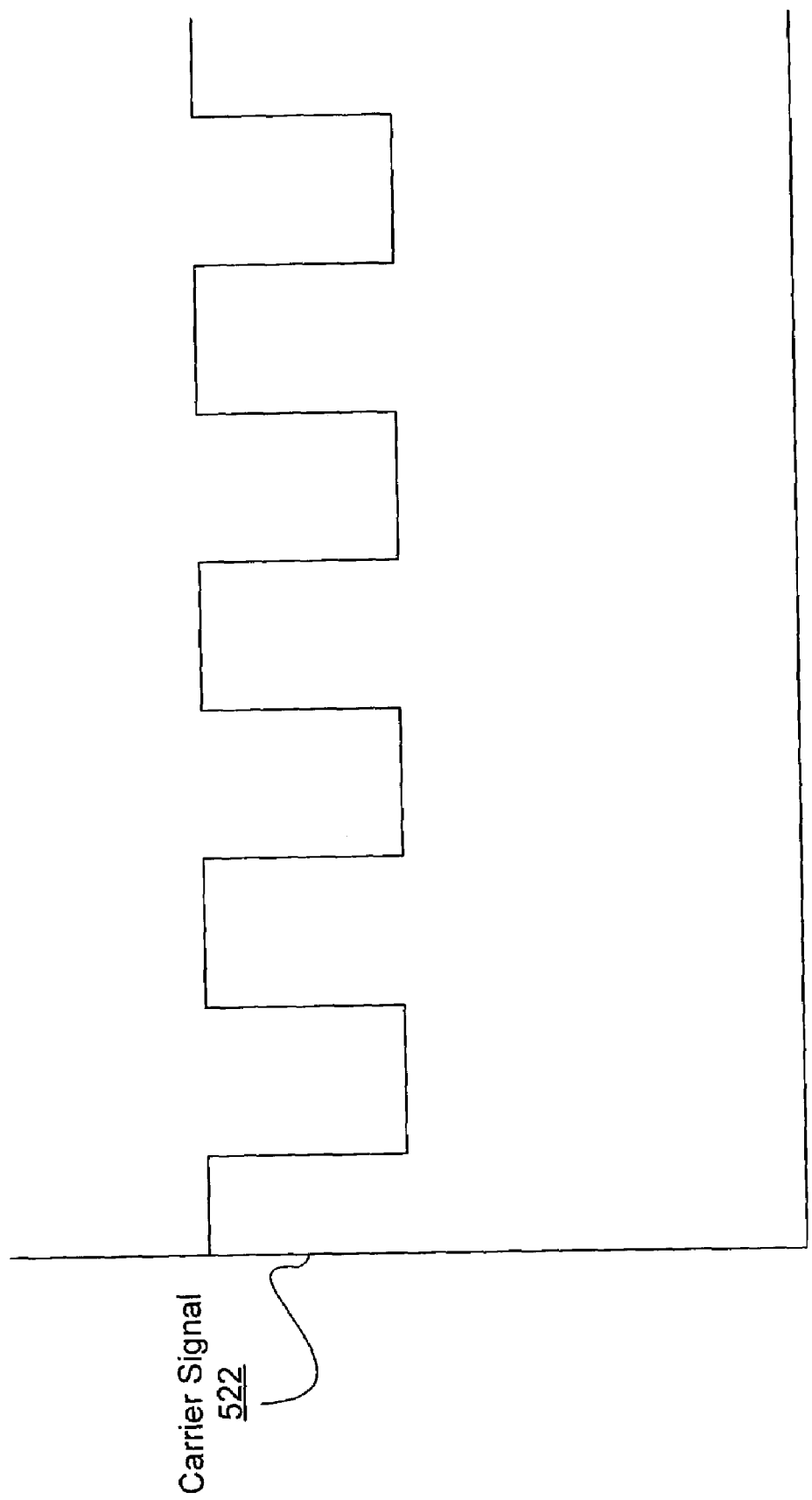
Figure 5D:
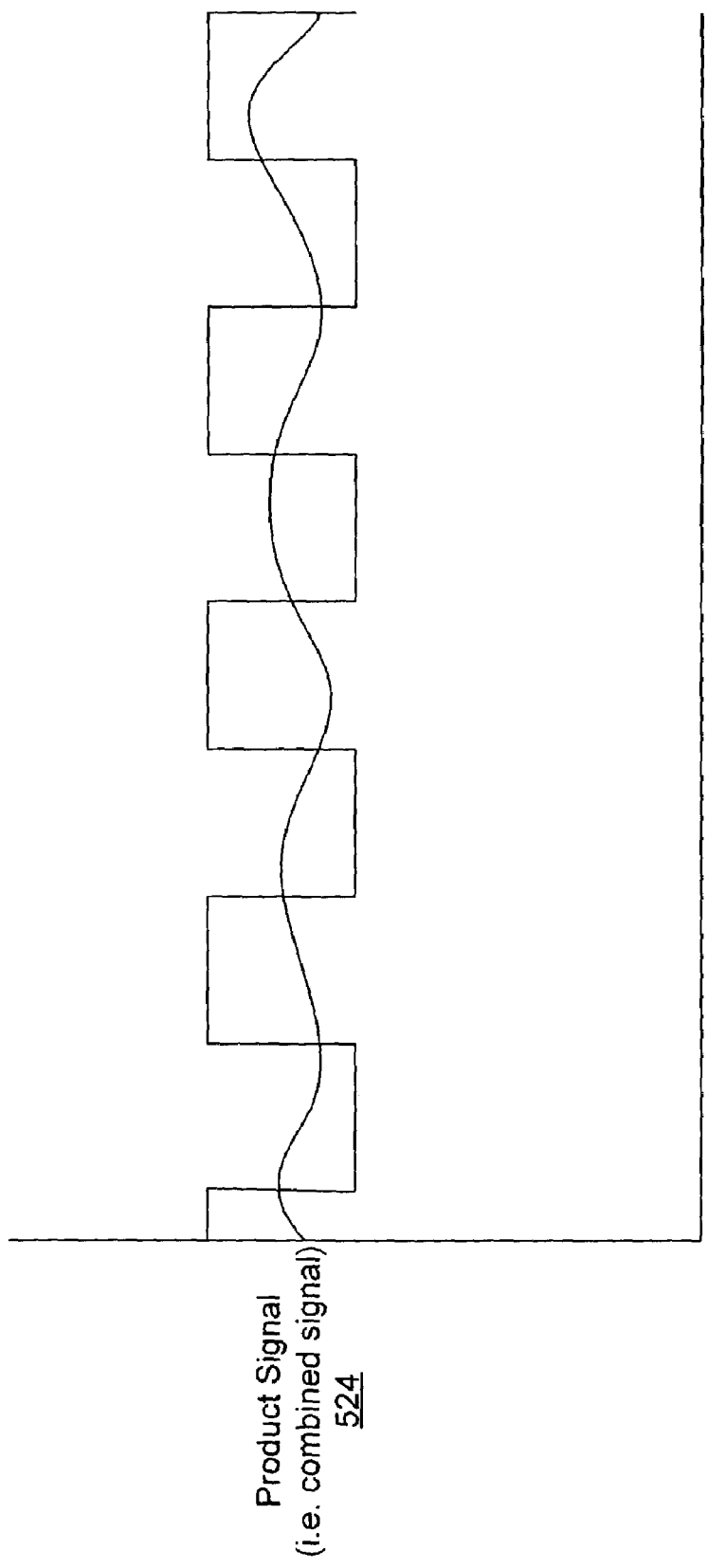

Referring now to FIGS. 5B through 5D, an exemplary spread spectrum technique is shown. FIG. 5B shows a conventional audio signal 520. FIG. 5C shows a carrier signal 522 including digital data from the data source 506 (FIG. 5A). FIG. 5D shows the modulated carrier signal 522 combined with the audio signal 520 to create a product signal or combined signal 524 having the modulated carrier signal 522 spread across all or a portion of the bandwidth of the audio signal 520.

In one embodiment, the amplitude of the digital data from the data source 506 is adjusted before combining the digital data with the audio signal to create the product signal. In this embodiment, the product signal maintains a fairly constant amplitude relative to the amplitude of the audio signal. An optimal signal-to-noise ratio of the data signal for a given level of masking is maintained by maintaining the fairly constant amplitude of the modulated carrier signal relative to the amplitude of the audio signal. The amplitude of the modulated carrier signal is typically adjusted slowly relative to the modulating data rate in order to prevent degrading of the masking effect on the audio, quality of the audio, or reliability of the digital data.

In another embodiment of the present invention, a single-frequency carrier can be replaced with any common spread-spectrum implementation, such as a frequency-hopping or direct-sequence technique. Replacing the single-frequency carrier with the common spread-spectrum implementation may create the appearance of noise, which can then be added to -the audio signal. The added noise is uniform and at a lower-level than the audio signal. Thus, the audio signal retains its full bandwidth, with some added background noise, instead of clipping part of the bandwidth completely, as with the notch filter 306 (FIG. 3).

In one embodiment, utilizing either the notch filter 306 or the spread-spectrum module, the modulated carrier signal is modulated toward the upper end of the bandwidth spectrum, such as 3 kHz, as discussed herein. Because the ear is less sensitive to signals at this end of the spectrum, the modulated carrier signal is inaudible to the ordinary listener. Further, the modulated carrier signal has a narrow bandwidth, as discussed herein, which allows the notching of the audio signal to be correspondingly narrow, and to thus have no perceptible effect on the audio signal.

Figure 6:
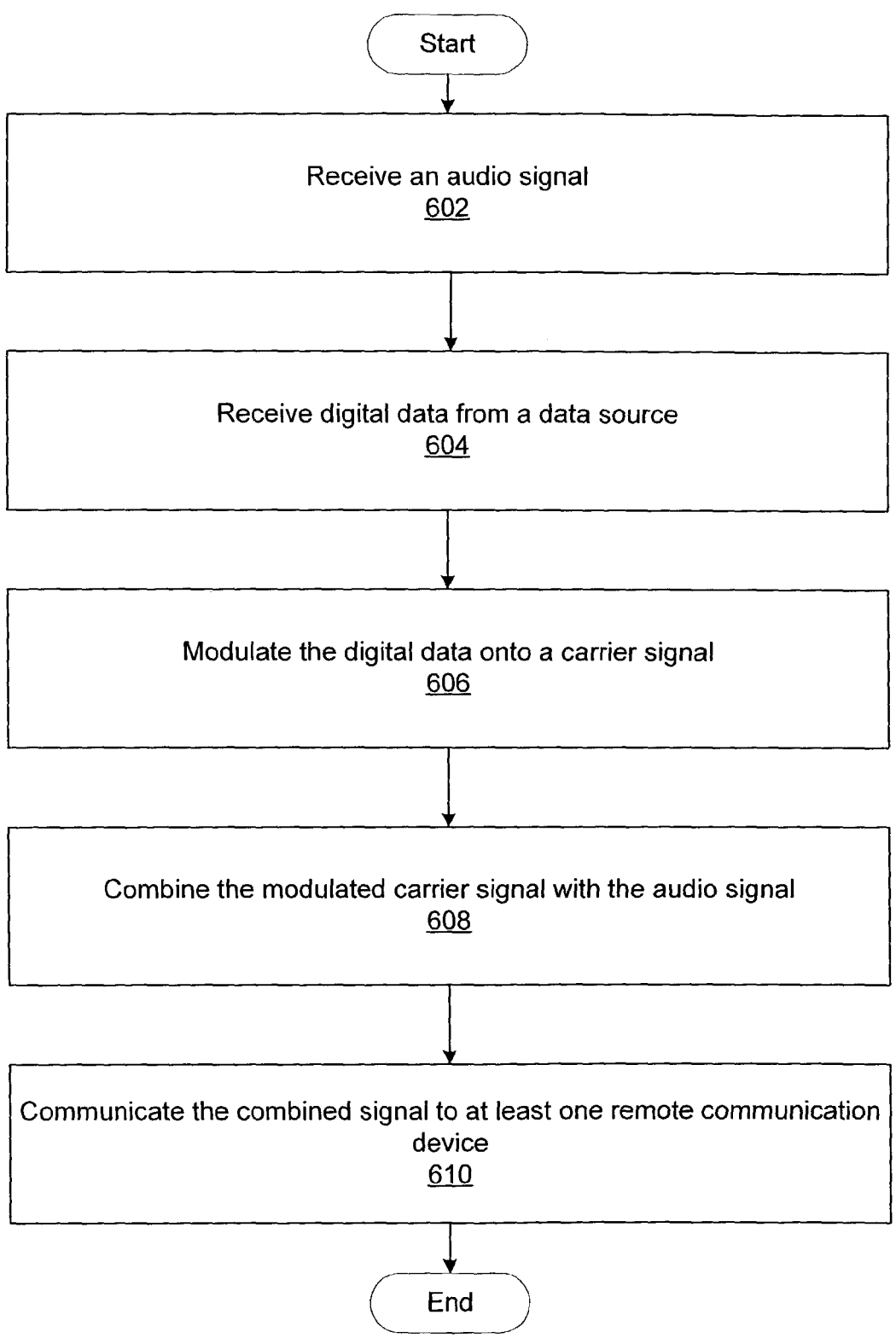
FIG. 6 is a flowchart illustrating an exemplary process for transmitting data during audio communication in accordance with an embodiment of the present invention.

Referring now to FIG. 6, a flowchart illustrating an exemplary process for transmitting data during audio communication is shown. At step 602, an audio signal is received. The audio signal may be received from any source, such as a telecommunication device, a computing device, and so on. A spectrum associated with the audio signal may also be determined. Further, the audio signal may be filtered utilizing a notch filter in order to create a subset of the spectrum for incorporating the modulated carrier signal.

At step 604, digital data is received from a data source. The data source may be any source of data in accordance with the present invention. The data may be generated by the local communication device 102 (FIG. 1) or the data may be received from an external source and processed by a data source module at the local communication device 102.

Next, at step 606, the digital data is modulated onto a carrier signal. The modulated carrier signal may be a spread-spectrum carrier signal in one embodiment of the present invention. In another embodiment of the present invention, the modulated carrier signal may be a single frequency carrier signal. The amplitude of the modulated carrier signal may be adjusted proportionally to an instantaneous amplitude of the audio signal. The adjustment may be made in a region of the spectrum near a region occupied by the modulated carrier signal.

Subsequently in step 608, the modulated carrier signal is combined with the audio signal. Any suitable method of combining the modulated carrier signal with the audio signal may be employed. Finally, in step 610, the combined signal is communicated to a remote communication device 104 (FIG. 1). The combined signal may be communicated to more than one remote communication devices 104 in accordance with the present invention. Communicating the combined signal may be accomplished via an IP audio line, a POTS line, etc. In alternative embodiments, the steps of the method may be performed in a different order. For example, the data may be received and modulated onto the carrier signal before the audio signal is received.

Figure 7:
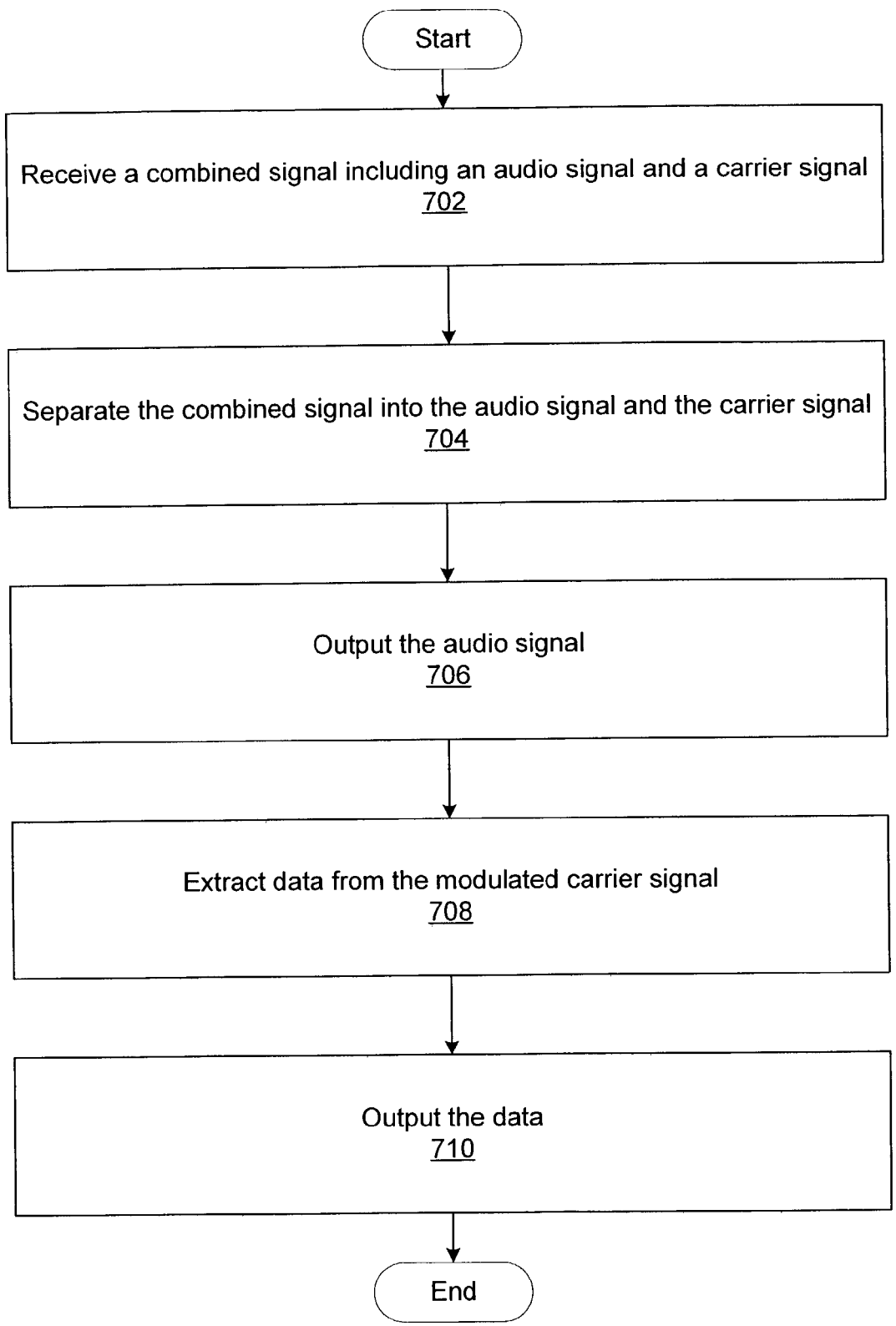
FIG. 7 is a flowchart illustrating an exemplary process for extracting digital data received during audio communication in accordance with an embodiment of the present invention.

Referring now to FIG. 7, a flowchart illustrating an exemplary process for extracting digital data received during audio communication in accordance with an embodiment of the present invention is shown. At step 702, a combined signal including an audio signal and a modulated carrier signal is received. As discussed herein, one or more remote communication devices 104 (FIG. 1) may receive the combined signal. At step 704, the combined signal is separated into the audio signal and the modulated carrier signal having the data. Any method of separating the audio signal from the modulated carrier signal is within the scope of the present invention. The audio signal is output in step 706. For instance, the audio signal may be played via a speaker associated with the one or more remote communication devices 104. Next, in step 708, data is extracted from the modulated carrier signal. The data is then output in step 710. Any method of outputting the data is within the scope of the present invention. For example, the data may be output on a screen associated with the one or more remote communication devices 104, a whiteboard, etc. In alternative embodiments, the steps of the method may be performed in a different order.

The above description is illustrative and not restrictive. Many variations of the invention will become apparent to those of skill in the art upon review of this disclosure. The scope of the invention should, therefore, be determined not with reference to the above description, but instead should be determined with reference to the appended claims along with their full scope of equivalents.

What is claimed is:

1. A method for a local communication device to communicate data to a remote communication device during an audio conference, the local communication device performing steps comprising:
  receiving an audio signal;
  receiving digital data from a data source;
  modulating the digital data onto a carrier signal;
  combining the carrier signal with the audio signal, wherein the combining comprises:
    filtering the audio signal to create a notch in the audio signal frequency spectrum at the frequency of the carrier signal, and adding the modulated carrier signal to the filtered audio signal such that the modulated carrier signal is substantially imperceptible;
  adjusting the amplitude of the modulated carrier signal proportionally to the instantaneous amplitude of the audio signal within a range of no more than about twice the width of the notch from the frequency of the modulated carrier signal; and,
  communicating the combined signal to at least one remote communication device.

2. The method of claim 1, wherein the communicating is performed over a POTS connection.

3. The method of claim 1, wherein the communicating is performed over an IP connection.

4. The method of claim 1, further comprising,
  separating the combined signal into the audio signal and the modulated carrier signal at the at least one remote device;
  demodulating the modulated carrier signal to extract the digital data; and
  reproducing the audio signal.

5. The method of claim 1, further comprising,
  reproducing the combined signal as audio signal by a remote communication device.

6. A method for a local communication device to communicate data to a remote communication device during an audio conference, the local communication device performing steps comprising:
  receiving a signal, the signal comprising an audio signal and a modulated carrier signal, wherein the audio signal is filtered to create a notch in the audio signal frequency spectrum at the frequency of the carrier signal, the amplitude of the modulated carrier signal is adjusted proportionally to the instantaneous amplitude of the audio signal within a range of no more than about twice the width of the notch from the frequency of the modulated carrier signal and the modulated carrier signal is added to the filtered audio signal and is substantially imperceptible from a far end conference device; and,
  the remote communication device performing steps comprising:
  separating the signal into an audio signal and a modulated carrier signal;
  demodulating the modulated carrier signal to extract digital data; and
  reproducing the audio signal.

7. the method of claim 6, wherein the communicating is performed over a POTS connection.

8. The method of claim 6, wherein the communicating is performed over an IP connection.

9. A conference device for communicating data to a far end conference device during an audio conference, comprising:
  a microphone to generate an audio signal;
  a digital interface operable to receive digital data;
  a network interface to connect to the far end conference device; and
  a processor module coupled to the microphone, the digital interface and the network interface;
  wherein the processor module is operable to,
    receive the audio signal from the microphone;
    receive digital data through the digital interface;
    modulate the digital data onto a carrier signal;
    adjust the amplitude of the modulated carrier signal proportionally to the instantaneous amplitude of the audio signal within a range of no more than about twice the width of the notch from the frequency of the modulated carrier signal;
    filter the audio signal to create a notch in the audio signal frequency spectrum at the frequency of the carrier signal;
    combine the audio signal and the adjusted, modulated carrier signal by adding the modulated carrier signal to the filtered audio signal; and
    transmit the combined signal to the far end conference device.

10. The conference device of claim 9 wherein the network interface is operable to connect to the far end conference device through a POTS connection.

11. The conference device of claim 10, wherein the network interface is operable to connect to the far end conference device through an IP connection.

12. A conference system for communicating data from between conference devices during an audio conference, comprising:
  a near end conference device, includes:
    a microphone to generate an audio signal;
    a digital interface operable to send digital data;
    a network interface; and
    a processor module coupled to the microphone, the digital interface and the network interface; and a far end conference device coupled to the near end conference device, includes:
a loudspeaker to reproduce an audio signal;
a digital interface operable to send digital data;
a network interface to connect to the far end conference device to receive a far end signal; and
a processor module coupled to the loudspeaker, the digital interface and the network interface,
wherein the processor module in the near end conference device is operable to,
receive the audio signal from the microphone;
receive digital data through the digital interface in the near end conference device;
modulate the digital data onto a carrier signal;
adjust the amplitude of the modulated carrier signal proportionally to the instantaneous amplitude of the audio signal within a range of no more than about twice the width of the notch from the frequency of the modulated carrier signal;
combine the carrier signal with the audio signal, wherein the audio signal is filtered to create a notch in the audio signal frequency spectrum at the frequency of the carrier signal and the modulated carrier signal is added to the audio signal such that the modulated carrier signal frequency is located at the notch such that the modulated carrier signal -is substantially imperceptible; and
transmit the combined signal to the far end conference device;
wherein the processor module in the far end conference device is operable to receive the combined signal from the network interface in the far end conference device;
separate the audio signal and the modulated carrier signal from the combined signal;
demodulate the carrier signal to extract digital data;
send the digital data through the digital interface in the far end conference device; and
send the audio signal to the loudspeaker for reproduction.

13. The conference system of claim 12, wherein the network interfaces are coupled through a POTS connection.

14. The conference system of claim 12, wherein the network interfaces are coupled through an IP connection.

15. The conference system of claim 12, further comprising,
a dumb far end conference device includes,
a microphone,
a loudspeaker; and
a network interface coupled to the microphone and the loudspeaker,
wherein the network interface is coupled to the network interface in the near end conference device; and
wherein the loudspeaker reproduces the combined signal received through the network interface.

* * * * *